Jan. 25, 1938.  T. R. HARRISON  2,106,300

CONTROL VALVE

Filed April 26, 1934

INVENTOR.
Thomas R. Harrison,
BY John E. Hubbell
ATTORNEYS.

Patented Jan. 25, 1938

2,106,300

UNITED STATES PATENT OFFICE 2,106,300

CONTROL VALVE

Thomas R. Harrison, Wyncote, Pa., assignor to The Brown Instrument Company, Philadelphia, Pa., a corporation of Pennsylvania Application April 26, 1934, Serial No. 722,465

9 Claims. (Cl. 251—34)

The general object of the present invention is to provide an improved control valve of the type adapted to vary the rate of flow through the valve of a controlled fluid in accordance with variations in the pressure of a fluid within a control or actuating pressure chamber of the valve.

In the most usual form of such a control valve, its pressure chamber has a movable wall, ordinarily formed by a flexible diaphragm, which moves as required to maintain a balance between the force with which the fluid pressure in the chamber tends to move the diaphragm or movable wall in one direction and an opposing spring loading force which increases with the extent of movement of the wall in said direction, said movable wall being connected to a movable valve member which is adjusted to different positions and thereby maintains different rates of flow of the controlled fluid as the fluid pressure in said pressure chamber varies. Such valves may be used for various purposes and in particular may be used in a control system including a meter which actuates a pilot mechanism to thereby regulate the passage of air from a source of compressed air into the pressure chamber in the control valve, and to regulate the exhaust of air from said chamber as required to maintain a fluid pressure in said chamber which is proportional to or varies in predetermined correspondence with changes in temperature, pressure fluid rate of flow or other control quantity or condition measured by the meter.

More specifically stated, the general object of the present invention is to provide a control valve of the type mentioned having suitably simple and desirable mechanical and operating characteristics, and which is adapted to create substantially the same percentage change in the rate of flow of the controlled fluid flow for each unit change in the pressure within the control pressure chamber of the valve throughout a wide range of variation of said flow.

In the preferred embodiment of the present invention, the means providing the loading force opposing the movement of the movable wall of the pressure chamber in response to variations of pressure within the latter, are arranged to make the valve member movement, commonly referred to as the valve lift, vary substantially in linear proportion with the pressure in the pressure chamber of the valve. With the controlling pressure and valve lift so related, the flow area through the port obstructed more or less by the movable valve member to thereby vary the rate of flow controlled, must vary in such a manner that the total valve lift is proportional to the logarithm of the flow, if each unit of valve lift is to produce substantially the same percentage change in the rate of flow of the control pressure, and if the pressure drop at the part controlled by the valve is approximately constant.

An approximately constant percentage change in the rate of flow of the controlled flow per unit change in valve lift through a relatively wide range of variation in the rate of the controlled flow is desirable for various reasons. For one thing, in a control system of the type mentioned above, the use of a control valve giving an approximately uniform percentage change in the rate of controlled flow for each unit of valve lift throughout the working range of valve lift, tends to a desirable uniformity in the governor or regulatory characteristics of the control system throughout said working range. As those skilled in the governor art understand, the governor or regulatory characteristic of any automatic control system installation must in general be adapted to the particular requirements of the installation, to insure proper sensitivity in regulation on the one hand, and to avoid objectionable hunting tendency on the other hand. A control system of the above mentioned type including a control valve giving substantially different percentage changes in the rate of the controlled flow for the same amount of valve lift in different portions of the valve lift range may be adjusted so that the governor characteristics of the control system are suitable with some one valve portion and corresponding rate of controlled flow, while with a different valve lift and controlled flow rate, the governor characteristics will be quite unsuitable. In general, if the percentage change in the controlled flow rate is substantially constant for similar changes in valve lift through the working range of variation in said rate and the governor characteristics are suitable for one value of said rate, they will not be unsuitable for all other values of that rate within the working range. This matter is of especial importance in control systems wherein the working range is relatively large, and modern requirements sometimes demand a control system in which the normal working range corresponds to 50% or more of the maximum possible variation in the controlled flow rate.

Another advantage of a control valve giving uniform percentage variations in the control rate of flow for similar variations in valve lift, arises from the fact that it permits the interchangeable use in many cases of control valves differing from one another in their maximum flow capacities. For example, it may be found in some particular control system installation that the actual working range can be accommodated either by a 2 inch or a 3 inch control valve constructed in accordance with the present invention, although an original estimate of the requirements had led to the selection and installation of a valve of one or the other of the two sizes. In such case, the capacity of either sized valve for satisfactory use makes it unnecessary to incur the expense, trouble and delay involved in replacing the valve originally installed by a valve of different size, as might be necessary if the valves of the two sizes, gave the control system different governor characteristics for the actual working range of variation of the controlled rate of flow.

Heretofore control valves of the general type mentioned have been devised in which the extent of valve lift is in approximate linear proportion to the changes in pressure in the pressure chamber of the valve, and in which the valve member is so shaped that the percentage change in the controlled flow rate will be approximately the same for similar changes in valve lift throughout a portion of the range of valve lift. Such prior valves ordinarily include one or the other of two features of valve form, namely, a valve member in the form of a plunger of the parabolic or other tapered plug type movable axially of a circular port into which the plunger is variably extended to thereby vary the flow area through the port, or a valve member in the form of a cylinder fitting in and moving axially of the valve port and formed with V-ports in its peripheral wall which are opened more or less by the axial adjustment of the plunger in the valve port through which it extends. The tapered plug type plunger and the V-port type plunger, when suitably designed and constructed, will each give approximately similar percentage changes in controlled flow for similar extents of plunger movement or valve lift during a certain portion of the range of plunger movement or valve lift, but each of these two plunger types has characteristics which are especially disadvantageous at some rates of the control flow. In particular, the tapered plug type plunger has the disadvantage that its perimeter or surface in contact with the fluid flowing through the most restricted portion of the valve port is at a maximum for small flows. In consequence, the tapered plug plunger gives rise to wire drawing and consequently to inaccuracy in flow regulation and objectionable wear when the flow is small. While the V-port type plunger gives rise to wire drawing at low flows, the resultant wear is confined mainly to the valve seat rather than to the plunger, and has less tendency to alter the flow capacity of the valve than in the case of the tapered plug type of plunger where the wear is largely confined to the plunger. The V-port type plunger, however, is subjected to a substantial chattering tendency by relatively rapid and substantial changes in the controlled flow rate which is a source of wear and in some cases may break the operating connection between the plunger and movable diaphragm. The V-port plunger in general is less satisfactory than the tapered plug type plunger when the controlled rate of flow is relatively large and subject to rapid variations.

In a preferred embodiment of the present invention, I largely avoid the objectionable, and retain the desirable characteristics of each of the above mentioned prior valve plunger forms, by the use of a valve plunger shaped to operate like a V-port plunger when the controlled flow is small and to operate like a tapered plug type plunger when the controlled flow is large. In its preferred form, said novel plunger comprises end to end sections one of which is cylindrical in outline and the other of which has the outline of a parabolic or other desirably shaped plug and which is formed with peripheral grooves extending in the general axial direction of the plunger across the division plane between said sections each such groove being V-shaped in section transverse to the plunger axis and having its bottom lying in a plane radial to the plunger axis but inclined thereto so that said edge merges at one end in the cylindrical outer surface of the cylindrical section of the plunger, and merges at its opposite end in the peripheral surface of the tapered plug section of the plunger.

By forming the valve plunger in the manner described, I obtain a high ratio of maximum to minimum free port areas with equal percentage area changes for similar changes in valve lift as the plunger is adjusted between its positions giving said maximum and minimum free port areas. In other words, the range of operation in which the percentage increase of flow is the same for unit changes in valve lift is made desirably large. A plunger so shaped may be machined as accurately as is necessary or desirable in a relatively easy and inexpensive manner. The form of the plunger, moreover, is such as to minimize the accumulation of dirt or scale on the plunger.

The general principles of my invention may be utilized and some of the above mentioned advantages obtained with valve members quite different from the simple plunger described above, for example, I may make use of a valve member comprising a tapered plug type plunger which closes the main valve port when the flow is small, and which is formed with an auxiliary port with which is associated a separate V-port type plunger mounted in and movable relative to the tapered plug type plunger.

The various features of novelty which characterize my invention are pointed out with particularity in the claims annexed to and forming a part of this specification. For a better understanding of the invention, however, its advantages and specific objects obtained with its use, reference should be had to the accompanying drawing and descriptive matter in which I have illustrated and described preferred forms of embodiment of my invention.

Figure 1:
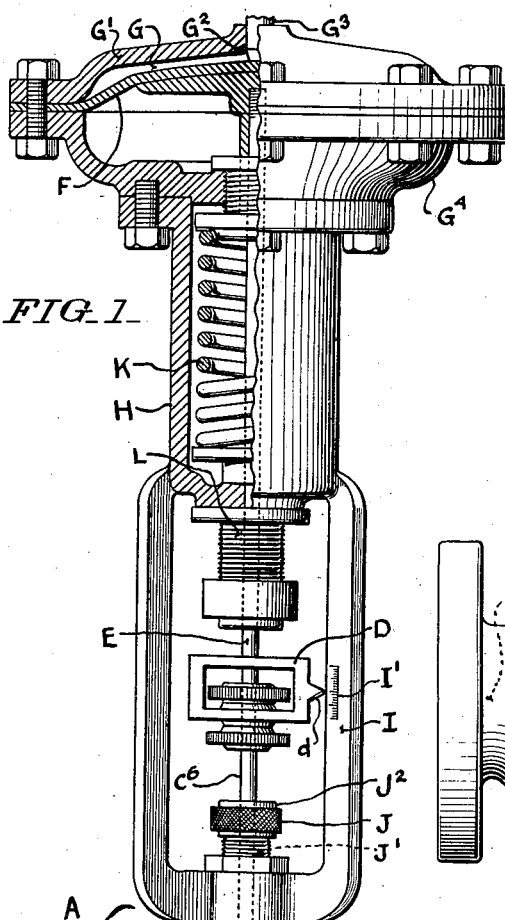
Fig. 1 is a sectional elevation of one form of control valve.
Figure 2:
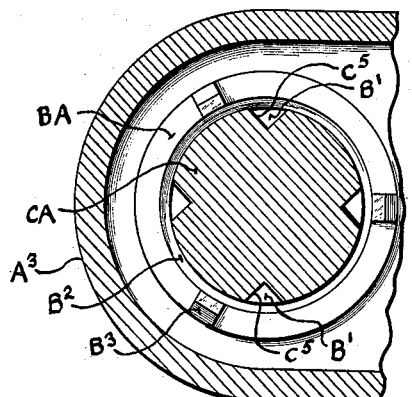
Fig. 2 is a section on the line 2—2 of Fig. 1.

The control valve A shown in Figs. 1 and 2 comprises a valve body of the balanced globe valve type having aligned inlet and outlet ports $A^1$ and $A^2$, respectively, separated by a partition wall $A^3$ comprising parallel upper and lower portions each formed with threaded apertures receiving aligned valve seat members B and BA, respectively. Each valve seat member is formed with a main cylindrical portion surrounding a port B' which is circular in cross section, and is formed with a conical valve seat $B^2$ at the upper side of said port.

The two valve seat members B and BA may be exactly similar in form, though advantageously in some cases the port and valve seat dimensions are greater in the case of the upper valve seat member B than in the valve seat member BA, so that the valve member is not exactly balanced but is subjected to a small fluid pressure resultant compensating more or less for the weight of the valve member and attached parts.

The movable valve member proper comprises upper and lower plungers C and CA, respectively, which are generally similar in form and are rigidly connected and may form parts of a single integral metallic structure. Each plunger comprises an upper conical valve seat engaging portion or section $C'$, an intermediate cylindrical portion or section $C^2$, and a lower tapered plug portion or section $C^3$. The lower end of the section $C^3$ of the plunger C is connected to the top of the portion $C'$ of the plunger CA by a stem portion $C^4$, the shape of which is without significance insofar as concerns the flow of the controlled flow. The conical valve seat engaging portion $C'$ of each plunger engages the corresponding valve seat $B^2$ in the closed position of the valve. As shown, each section $C'$ is in guiding engagement with guide fingers or projections $B^3$ extending upwardly from the corresponding valve seat member B. Each plunger portion $C^2$ is only sufficiently smaller in diameter than the corresponding port opening $B^1$ to provide necessary clearance.

A plurality of orifice grooves $C^5$ are formed, as by a milling operation, in a portion of each plunger C beneath its valve seat engaging section $C'$. Each orifice groove is V-shaped, i. e. its opposite sides are inclined to one another and intersect at the bottom line of the groove. As shown in Fig. 1, the bottom line of each groove $C^5$ lies in a plane radial to the axis of the plunger and inclined to that axis at about the angle to the latter of the surface element of the conical valve seat engaging surface $C'$. The bottom line of each groove $C^5$ intersects the outer surface of the corresponding plunger approximately at the plane of intersection of the sections $C^1$ and $C^2$, and intersects the outer surface of the tapered plug section $C^3$ of the plunger intermediate the upper and lower ends of the last mentioned section. The depth of each groove measured in the axial plane including the bottom line of the groove thus increases from each end of the groove toward an intermediate portion of the latter.

In operation no flow through the port B' can occur when the conical seat engaging portions $C'$ of the two plungers are in engagement with their respective seats $B^2$. As the plungers move upward from their closed positions, flow occurs through the grooves $C^5$, the volume of the flow through each groove depending on the cross-sectional area of the portion of the groove immediately adjacent the top of the corresponding cylindrical port B'. As will be apparent, when the plungers are in positions above their fully closed positions, but not sufficiently elevated to prevent the lower portions of their sections $C^2$ from extending downward into the corresponding cylindrical ports B', the inclined side walls of each groove $C^5$ and the cylindrical wall of the corresponding port B', unite to form a triangular orifice or flow passage, the most restricted and flow controlling portion of which is that lying in the plane transverse to the axis of the corresponding port B' and including the circle at which the upper end of said cylindrical port and the lower end of the corresponding tapered valve seat $B^2$ meet. When the plunger lift increases sufficiently to carry the bottom of each plunger section $C^2$ above the top of the corresponding cylindrical port B', flow through the annular port area between the walls of those ports and the peripheries of the sections $C^2$ occurs. As the plunger lift increases after the last mentioned flow starts a subsequent intermediate portion of the lift range, the flow is partly through the grooves and partly through the annular port areas between the cylindrical port walls and the tapered plug sections $C^3$ of the plungers. As the lift is further increased, the portion of the flow which passes through the grooves $C^5$ diminishes, and when the plunger lift is sufficient to carry the lower ends of the grooves $C^5$ above the tops of the ports B', the volume of flow becomes wholly dependent on the flow capacity of the annular space between the walls of the ports B' and the tapered plug sections $C^3$ of the plungers.

As those skilled in the art will understand, with suitable care in the design and construction of plungers of the type shown in Fig. 1, the logarithm of the rate of flow through each port B' may be caused to vary in close correspondence with the plunger lift, throughout approximately the full range of such lift movement. For control purposes of the character hereinbefore mentioned, precise mathematical proportion between the volume of flow and the valve lift is not required. From the standpoint of the governor characteristics of the control system, it will ordinarily be sufficient if the percentage rate of change in the controlled flow per unit of valve lift is not more than twice as great in any portion of the working range of lift than it is in any other portion of that range. Those skilled in the art will understand also that while it is usually convenient to have the valve arranged for vertical movement of the plungers as shown in Fig. 1, it is in general immaterial whether the plungers are arranged to increase the flow by uprising movements as shown in Fig. 1 or by downward movements.

The means employed to give the plungers C and CA their flow varying movement may be of any usual or suitable form and no novelty is claimed herein in respect to the form of such means illustrated somewhat conventionally in Fig. 1. As there shown the plungers are given their movement by means of a stem $C^6$ connected to and extending upward from the upper plunger C through an aperture in a head or cover plate member $A^4$ closing an opening in the top of the valve casing or body. At its upper end, the stem $C^6$ is connected by a coupling D to the lower end of a valve operating rod E which is connected at its upper end to a diaphragm F forming the movable lower wall of a pressure chamber G formed between the diaphragm F and a superposed casing part $G^1$. The latter is formed with an inlet $G^2$ in which is secured one end of a pressure transmitting pipe $G^3$ adapted to transmit air between the chamber G and the pilot valve mechanism of a suitable control instrument.

As shown, the diaphragm F is clamped at its periphery between the rim portions of the casing member $G^1$ and a cooperating lower casing member $G^4$. The latter is mechanically connected to and supported by the valve body A. The connection shown between the member $G^4$ and body A comprises a spring casing part H connected at its upper end to the casing part $G^4$ and connected at its lower end to a tubular or cage like part I which at its lower end is connected to the head or cover plate member A⁴. As shown, the header A⁴ supports a stuffing box J for the stem C⁶. The stuffing box J may well be and is shown as of the known grease seal type comprising a chamber J¹ filled with lubricant inserted and put under suitable pressure by a screw plunger J² which may be tightened up from time to time to maintain a proper lubricant pressure within the chamber J¹.

Within the spring casing H is located a spring loading device shown as a single helical spring K surrounding the rod E and acting between the underside of the diaphragm F and an abutment shown as formed by the upper end of a tubular part L through which the member E is axially movable and by which it is guided in its movement. As shown, the parts H and L are in threaded engagement so that the latter may be vertically adjusted to vary the tension of the loading spring K. The valve member is advantageously provided with means for indicating the extent of valve lift. The indicating means shown for the purpose comprise an index $d$ carried by the coupling part D and moving along a scale I' on the member I.

Figure 3:
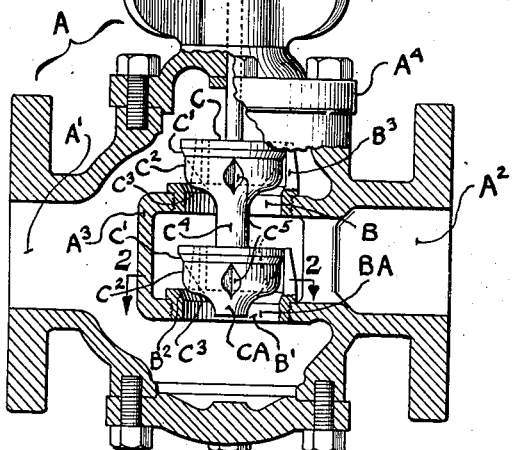
Fig. 3 is a diagrammatic representation of a control system in which the valve of Figs. 1 and 2 may be used.
Figure 3:
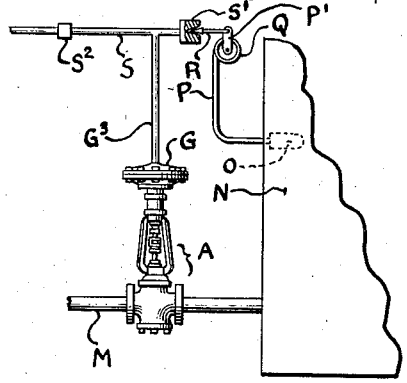

In Fig. 3, I have conventionally illustrated by way of example one form of control system in which the valve A of Figs. 1 and 2 may be utilized. In Fig. 3 the valve A is employed to control the flow of a fluid fuel through a supply pipe M to the burner inlet of a furnace N, in accordance with a furnace temperature to which the bulb O of an expansible fluid thermometer is exposed. In Fig. 3, the pressure within the bulb O, which is a measure of the temperature to which the bulb is subjected, is transmitted by a pipe P to the stationary end of meter or pressure gauge in the form of a Bourdon tube helix Q. The movable end P' of the latter gives movement to a valve member R diagrammatically shown in Fig. 3 as a needle valve and axially movable in projecting into the bleeder orifice S' of a pipe S leading from a source of air under pressure. Preferably air is supplied to the pipe S as to maintain constant pressure at the supply side of a restricted orifice S² between the source of pressure and the bleeder orifice S'. The pipe G³ connected at one end to the pressure chamber G of the control valve, is connected at its opposite end to the portion of the pipe S between the orifices S' and S².

With the described arrangement, the pressure within the part of the pipe S between the orifices S' and S² and in the chamber G will normally, i. e. in any steady operating condition, be whatever is required to make the flow through the port S' equal to the flow through the port S². The flow through the port S' depends, of course, upon the adjustment of the valve R, and hence upon the temperature of the bulb O. Since the valve A, as shown, is adjusted to increase or decrease the fuel flow through the pipe M, by a decrease or increase, respectively, of the pressure within the chamber G, to maintain an approximately constant bulb temperature, the meter Q must be arranged to give the valve R an opening adjustment whenever the bulb temperature drops. An opening adjustment of the valve R lowers the pressure in the chamber G and increases the supply of fuel to the furnace. Conversely, on a rise in the bulb temperature above normal, the valve R is adjusted by the meter Q in the closing direction, and thereby increases the pressure in the chamber G and reduces the fuel supply to the furnace. In practice, the meter control provisions for regulating the pressure in the chamber G will ordinarily differ in form from those illustrated diagrammatically in Fig. 3. One practical form of control provisions well adapted for the purpose is illustrated in a co-pending application, Serial No. 693,388 filed October 12, 1933, jointly by Frederick W. Side and myself and other practical forms of control provisions generally suitable for the purpose are known.

Figure 4:
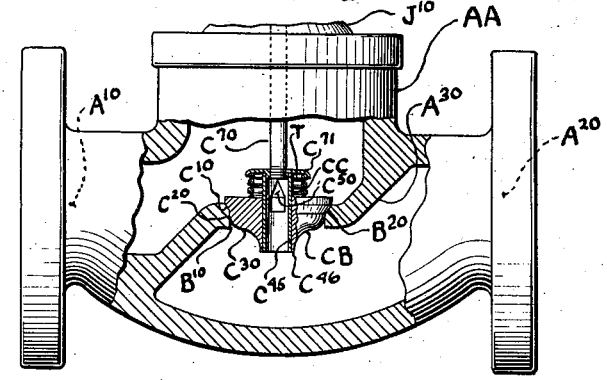
Fig. 4 is an elevation in section of a portion of a control valve of modified form.

The logarithm of the flow may be made approximately proportional to the extent of lift of a valve actuating member by valves adapted to pass all of the flow through one or more V-ports when the flow is small and adapted to make the volume of flow when relatively large primarily dependent on the position of a tapered plug type plunger, which is quite different in character from that shown in Figs. 1 and 2. One such valve is shown in Fig. 4. The valve shown in Fig. 4 is an unbalanced valve comprising a body AA formed with inlet and outlet chambers A¹⁰ and A²⁰, respectively, separated by a partition A³⁰ formed with a cylindrical port B¹⁰ having a conical valve seat B²⁰ at its inlet end. In the closed condition of the valve, the seat B²⁰ is engaged by the seat engaging portion C¹⁰ of a valve member CB having a tapered section C³⁰ then extending into or through the cylindrical portion of the port B¹⁰. The valve member CB is formed with an axial passage C⁴⁵ which slidingly receives a tubular valve member CC. The latter is open at its outlet chamber end but is closed at its opposite end which is attached to the end of a valve stem or valve operating member C⁷⁰ which extends through the valve casing, a stuffing box J¹⁰ preventing leakage along the stem C⁷⁰. The outer end of the stem C⁷⁰ may be connected to any suitable operating device (not shown).

One or more V-ports C⁵⁰ are formed in the upper portion of the cylindrical wall of the valve member CC with their apices pointing toward the closed end of the latter. In the closed position of the valve, the member CC is held in the passage C⁴⁵, so that each port C⁵⁰ is fully closed by the wall of the passage C⁴⁵. As the stem C⁷⁰ is moved to open the valve, the member CC initially moves relative to the member CB, thus gradually opening the V-ports C⁵⁰. During this initial movement of the stem C⁷⁰ and valve member CC, the valve member CB remains stationary with its seat engaging portion C¹⁰ in contact with the seat B²⁰ as a result of the unbalanced fluid pressure on the member CC, the effect of which is supplemented, in the arrangement shown by a spring T acting between the valve member CB and a collar C⁷¹ carried by the stem C⁷⁰. The opening movement of the valve member CC relative to the valve member CB is terminated when sufficient to bring an outturned flange C⁴⁶ at the outlet chamber end of the valve member CC into engagement with the corresponding end of the valve member CB. Further opening movement of the stem C⁷⁰ moves the valve member CB then in the opening direction so that a portion of the flow then passes through the annular port area then opened between the wall of the port B¹⁰ and the valve member CB. As the valve opening movement continues, the last mentioned portion of the flow increases relative to the portion of the flow through the V-ports. For the described mode of operation, as those skilled in the art will understand, the portion of the tapered plug section C²⁰ immediately adjacent the seat engaging portion $C^{10}$ must be quite sharply tapered so that only a very slight displacement of the valve member CB from its seat engaging position is required to eliminate all possibility of objectionable wire drawing at the periphery of the valve member CB. In the valve shown in Fig. 4 as in that shown in Figs. 1 and 2, the flow variation produced by valve closing movements are the reverse of those produced by valve opening movements.

While in accordance with the provisions of the statutes, I have illustrated and described the best form of embodiment of my invention now known to me, it will be apparent to those skilled in that art that changes may be made in the form of the apparatus disclosed without departing from the spirit of my invention as set forth in the appended claims and that in some cases certain features of my invention may be used to advantage without a corresponding use of other features.

Having now described my invention, what I claim as new and desire to secure by Letters Patent is:—

1. The combination in a control valve having a port, of means adjustable to and fro axially of said port to progressively vary the flow through the port between upper and lower limits, and providing and substantially confining the flow to one or more flow passages which are triangular in cross section and of aggregate area substantially less than that of the port when adjusted for relatively small flow, and providing a tapered plug portion extending into said port and defining the inner side of an unobstructed zone of flow extending about the axis of said port and defined at its outer side by the wall of said port when adjusted for a larger flow, and thereby making the percentage of flow variation produced by a given extent of axial adjustment of said means substantially constant throughout the full range of said adjustment.

2. The combination in a control valve having a port circular in cross section, of means adjustable axially of said port to variably obstruct the latter and providing one or more orifices for flow through said port triangular in cross section and of aggregate cross sectional area substantially less than the area of said port when adjusted for relatively small flows, and providing a tapered plug portion extending into said port and defining the inner side of an unobstructed annular port area surrounded by the peripheral wall of said port when adjusted for a larger flow, and thereby making the percentage of flow variation produced by a given extent of axial adjustment of said means substantially constant throughout the full range of said adjustment.

3. The combination in a control valve having a port, of means adjustable axially of said port to vary the flow therethrough, and including means for variably obstructing said port and shaped to provide one or more flow passages through said port which are triangular in cross section and of aggregate cross sectional area substantially less than that of said port when adjusted for small flows, and to provide a tapered plug portion extending into said port and defining the inner side of an unobstructed annular outer portion of said port when adjusted for a larger flow, and thereby making the percentage of flow variation produced by a given extent of axial adjustment of said means substantially constant throughout the full range of said adjustment.

4. A control valve comprising a port circular in cross section and a valve member movable axially of said port to vary the flow therethrough and comprising a cylindrical portion of approximately the same diameter as said port and extending into the latter in low flow positions of said member, and comprising a tapered plug section at one end of said cylindrical portion the surfaces of said portions merging smoothly into one another and partially filling said port when the valve member is moved to withdraw said cylindrical portion from the port, said member being formed at its periphery with V-grooves, the bottom edges of which are inclined to the axis of said member and each of which includes a longitudinal portion in said cylindrical section and another longitudinal portion in said tapered plug section, whereby the percentage of flow variation produced by a given extent of axial adjustment of said valve member is maintained substantially constant throughout the full range of said adjustment.

5. A control valve comprising a port circular in cross section and a valve member movable axially relative to said port to vary the flow therethrough, and comprising a cylindrical portion extending into and substantially filling said port in the closed position of the valve and a parabolic plug section at one end of said cylindrical portion and partially filling said port when the valve member is moved to withdraw said cylindrical portion from the port, said member being formed at its periphery with V-grooves, each having its edge inclined to the axis of said member with one end intersecting the periphery of said cylindrical section and with its other end intersecting the periphery of said parabolic plug section, whereby the percentage of flow variation produced by a given extent of axial adjustment of said valve member is maintained substantially constant throughout the full range of said adjustment.

6. A control valve comprising a port and means for progressively varying flow therethrough between widely different maximum and minimum flow values, comprising a valve member of tapered plug form movable axially of said port between a low flow position in which it extends into said port and prevents flow between the peripheral walls of said section and port, and larger flow positions in which it permits flows of varying magnitudes between said walls, said member being formed with a passage extending through it, and a second hollow valve member slidingly adjustable in said passage and open at one end and formed with one or more openings in its wall so shaped that on the longitudinal adjustment of said second member in said passage, each such opening unites with an adjacent portion of the first mentioned valve member to form an orifice, triangular in cross section and of an area varying with the extent of said adjustment, for flow through said passage and hollow valve member from one side of said port to the other.

7. A control valve comprising a port and means for progressively varying flow therethrough between widely different maximum and minimum flow values, comprising a valve member of tapered plug form movable axially of said port between a low flow position in which it extends into said port and prevents flow between the peripheral walls of said section and port, and larger flow positions in which it permits flows of varying magnitudes between said walls, said member being formed with a passage extending through it, and a second hollow valve member slidingly adjustable in said passage and open at one end and formed with one or more openings in its wall so shaped that on the longitudinal adjustment of said second member in said passage, each such opening unites with an adjacent portion of the first mentioned valve member to form an orifice, triangular in cross section and of an area varying with the extent of said adjustment, for flow through said passage and hollow valve member from one side of said port to the other, and means for first adjusting said second valve member relative to the first valve member and for then adjusting the last mentioned valve member relative to said port in increasing flow through said port from its minimum value and for adjusting said members in the reverse order in decreasing the flow through said port.

8. The combination in a control valve of a casing having inlet and outlet chambers and ported partition means between said chambers and a valve means mounted in said casing and axially adjustable therein to variably throttle flow between said chambers and cooperating with said partition means to provide flow passages between said chambers which are triangular in cross section and progressively increase in aggregate cross section as said means is progressively adjusted through an initial portion of its range of adjustment in one direction and to provide an annular flow port between said chambers progressively increasing in said section as the said progressive adjustment of said means continues until the area of said annular port is substantially greater than the maximum aggregate area of said passages, whereby the percentage of flow variation produced by a given extent of axial adjustment of said valve means is maintained substantially constant throughout the full range of said adjustment.

9. The combination in a control valve having a port, of movable valve parts comprising an operating member and port obstructing parts providing flow passages which are triangular in cross section and a tapered plug and adapted to so vary the flow through said port, when the difference in the pressures at the inlet and outlet sides of the port is constant, on movement of said member axially of said port, that the logarithm of the flow through the port is proportional to the movement of said member, said member, flow passages, and tapered plug being so relatively disposed, that the flow through the port is substantially confined to flow through said flow passages when said member is adjusted for relatively small flows, and that when adjusted for a larger flow, the flow is determined mainly by the cross section of an annular flow passage then defined at its outer side by the surrounding wall of said port and at its inner side by the portion of said plug extending into said port.

THOMAS R. HARRISON.